United States Patent [19]
Williams et al.

[11] Patent Number: 5,600,824
[45] Date of Patent: Feb. 4, 1997

[54] CLOCK GENERATING MEANS FOR GENERATING BUS CLOCK AND CHIP CLOCK SYNCHRONOUSLY HAVING FREQUENCY RATIO OF N-1/N RESPONSIVE TO SYNCHRONIZATION SIGNAL FOR INHIBITING DATA TRANSFER

[75] Inventors: James B. Williams, Lowell, Mass.; Kenneth K. Chan, San Jose, Calif.; John F. Shelton, La Selva Beach, Calif.; Ehsan Rashid, Pleasanton, Calif.

[73] Assignee: Hewlett-Packard Company, Palo Alto, Calif.

[21] Appl. No.: 191,865

[22] Filed: Feb. 4, 1994

[51] Int. Cl.⁶ ............................................. G06F 1/04
[52] U.S. Cl. ..................... 395/551; 395/876; 395/881; 395/556; 364/271; 364/271.2; 364/271.1; 364/DIG. 1
[58] Field of Search ............................ 395/849, 878, 395/880, 881, 550

[56] References Cited

U.S. PATENT DOCUMENTS

| | | | |
|---|---|---|---|
| 5,235,698 | 8/1993 | Lan | 395/550 |
| 5,347,559 | 9/1994 | Hawkins et al. | 377/54 |
| 5,379,408 | 1/1995 | Izzi et al. | 395/550 |
| 5,381,542 | 1/1995 | Carlson | 395/550 |

FOREIGN PATENT DOCUMENTS

| | | | |
|---|---|---|---|
| 0042924 | 6/1982 | European Pat. Off. | G06F 13/42 |
| 0375794 | 4/1990 | European Pat. Off. | G06F 1/04 |
| 0478132 | 1/1992 | European Pat. Off. | G06F 13/42 |

*Primary Examiner*—Thomas C. Lee
*Assistant Examiner*—Sang Hui Kim

[57] ABSTRACT

A data communication system for communicating data between a bus running at a first clock frequency and a circuit block operating synchronously with the data bus at a second clock frequency. The system includes a clock generator for generating a bus clock signal at the first clock frequency and a chip clock signal at the second clock frequency wherein the first and second clock signal frequencies are in the ratio of (N−1):N where N is an integer greater than 1 and wherein the bus and chip clock signals are synchronized once every N cycles of the chip clock signal. The clock generator also generates a synchronization signal indicating the chip clock signal cycle in which the bus and chip clock signals are synchronized. The circuit block includes an interface circuit for receiving and transmitting data on the bus. The system also includes circuits connected to each circuit block for identifying a chip clock signal cycle in which data cannot be transmitted by the circuit block on the bus and a chip clock signal cycle in which data cannot be received by the circuit block from the bus, there being one of each type of cycle in each contiguous block of N chip clock cycles.

4 Claims, 4 Drawing Sheets

CLOCK GENERATING MEANS FOR GENERATING BUS CLOCK AND CHIP CLOCK SYNCHRONOUSLY HAVING FREQUENCY RATIO OF N-1/N RESPONSIVE TO SYNCHRONIZATION SIGNAL FOR INHIBITING DATA TRANSFER

FIELD OF THE INVENTION

The present invention relates to electronic circuits constructed from a plurality of chips or circuit blocks connected to a bus, and more particularly, to an improved method of synchronizing the chips to the bus clock.

BACKGROUND OF THE INVENTION

Many electronic systems such as computers are constructed from a plurality of chips that are interfaced to a synchronous bus. The transfer of data between the various chips and the bus is synchronized with a bus clock whose maximum speed is determined by the electrical characteristics of the bus.

In many cases, the chips are capable of running at significantly higher clock speeds than the bus can support. The internal speed of a chip is limited by the length of conductors in the chip and by the various parasitic capacitances in the chip. Since signal propagation distances in a chip are much smaller than the signal propagation distances on the bus, chips can often run at much higher speeds than the bus. If the chips do not need to transfer data to or from the bus on each bus cycle, a significant speed advantage may be obtained by running the chips at a clock speed that exceeds the bus clock.

Computer systems in which the microprocessor chip runs at a multiple of the bus speed are known to the prior art. For example, systems in which the microprocessor operates at a clock speed that is twice the bus speed are commercially available. Since a microprocessor may require several internal clock cycles to execute an instruction, running the microprocessor at a higher speed than the bus clock results in a significant reduction in the execution of such instructions.

Unfortunately, such microprocessor systems can only run at fixed integer multiples of the bus clock. The optimum ratio between the chip clock and the bus clock is determined by the system parameters. In a system having a very fast bus, the optimum ratio will be smaller than in a system having a slower bus. In prior art synchronous systems, such as the microprocessors discussed above, a different chip, or at least additional bus logic circuits, is needed to implement a few fixed ratios of chip speed to bus speed. The cost of providing a number of different chips is prohibitive; hence, the optimum ratio is seldom achieved.

Systems in which data is transferred asynchronously between the bus and chips avoid these problems, since the internal clock of a chip is free to operate at any speed relative to the bus speed. Unfortunately, these systems require much more complex bus interface hardware. In addition, the timing of the system operations can not always be predicted in asynchronous systems. Such timing uncertainties can lead to problems in multi-processor systems that rely on a predictable execution order for instructions.

Broadly, it is the object of the present invention to provide an improved method for synchronizing chips to a bus.

It is a further object of the present invention to provide a synchronous bus interface system that allows the chips to run at a plurality of different clock speeds for any given bus speed.

These and other objects of the present invention will become apparent to those skilled in the art from the following detailed description of the invention and the accompanying drawings.

SUMMARY OF THE INVENTION

The present invention is a data communication system for communicating data between a bus running at a first clock frequency and a circuit block operating synchronously with the data bus at a second clock frequency. The system includes a clock generator for generating a bus clock signal at the first clock frequency and a chip clock signal at the second clock frequency wherein the first and second clock signal frequencies are in the ratio of (N−1):N. Here, N is an integer greater than 1. The bus and chip clock signals are synchronized once every N cycles of the chip clock signal. The clock generator also generates a synchronization signal indicating the chip clock signal cycle in which the bus and chip clock signals are synchronized. The circuit block includes an interface circuit for receiving and transmitting data on the bus. The system also includes circuits connected to each circuit block for identifying a chip clock signal cycle in which data cannot be transmitted by the circuit block on the bus and a chip clock signal cycle in which data cannot be received by the circuit block from the bus, there being one of each type of cycle in each contiguous block of N chip clock cycles. In addition, the present invention allows the bus to chip clock ratios of 1:1 without increased complexity or loss of performance.

DETAILED DESCRIPTION OF THE INVENTION

Figure 1:
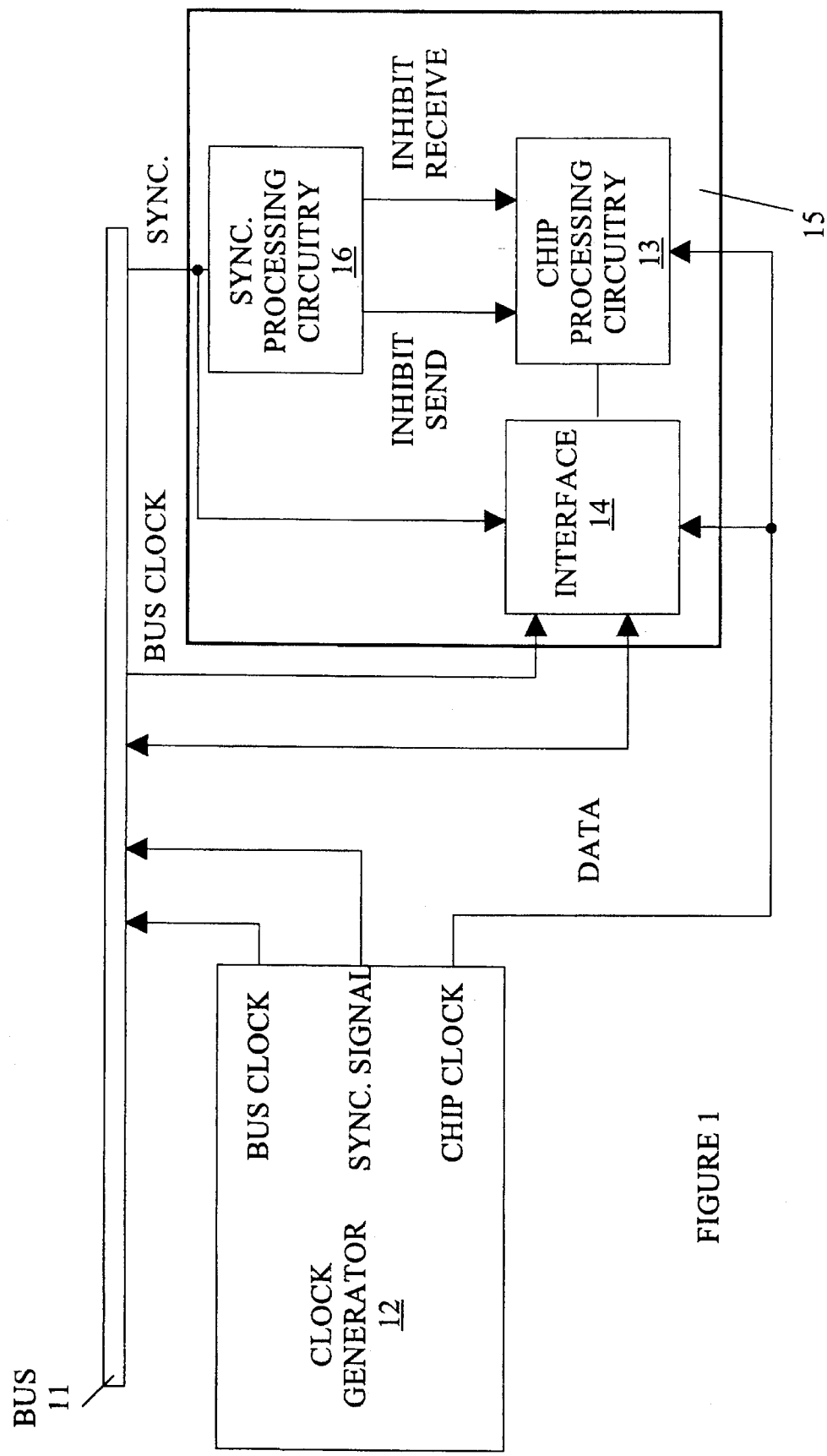
FIG. 1 is a block diagram of a chip utilizing the present invention and which is connected to a synchronous bus.

The present invention may be more easily understood with reference to FIG. 1 which is a block diagram of a chip 15 connected to a synchronous bus 11. Chip 15 operates at a frequency set by a chip clock. Bus 11 operates at a frequency set by a bus clock which, in general, has a frequency less than or equal to that of the chip clock. Both the chip and bus clocks are derived from a single clock crystal in clock generator 12. In the present invention, the chip clock frequency is either equal to the bus clock frequency or is related to it in the ratio of N:(N−1), where N is an integer greater than 1. That is, the possible chip clock to bus clock frequencies are 2:1, 3:2, 4:3, and so on. As will be explained in more detail below, the case in which the chip and bus clocks are the same frequency can also be accommodated by the present invention.

Consider the case in which the chip to bus clocks are in the ratio of 4:3. The chip processing circuitry 13 operates at the chip clock rate. However, chip 15 receives and transmits data based on the bus clock. In the embodiment of chip 15 shown in FIG. 1, data is transferred between the bus and the chip via an interface circuit 14 which moves data between the bus domain and the chip domain. The manner in which this interface circuit operates will be discussed in more detail below.

For every 4 chip clock cycles, there are only 3 bus clock cycles. Hence, there must be at least one chip clock cycle out of four in which chip 15 cannot receive new data from the bus and at least one chip clock cycle in four in which chip 15 cannot transmit new data on the bus, since at most three data bits per data line can be transmitted or received in the corresponding 3 bus clock cycles.

Figure 2:
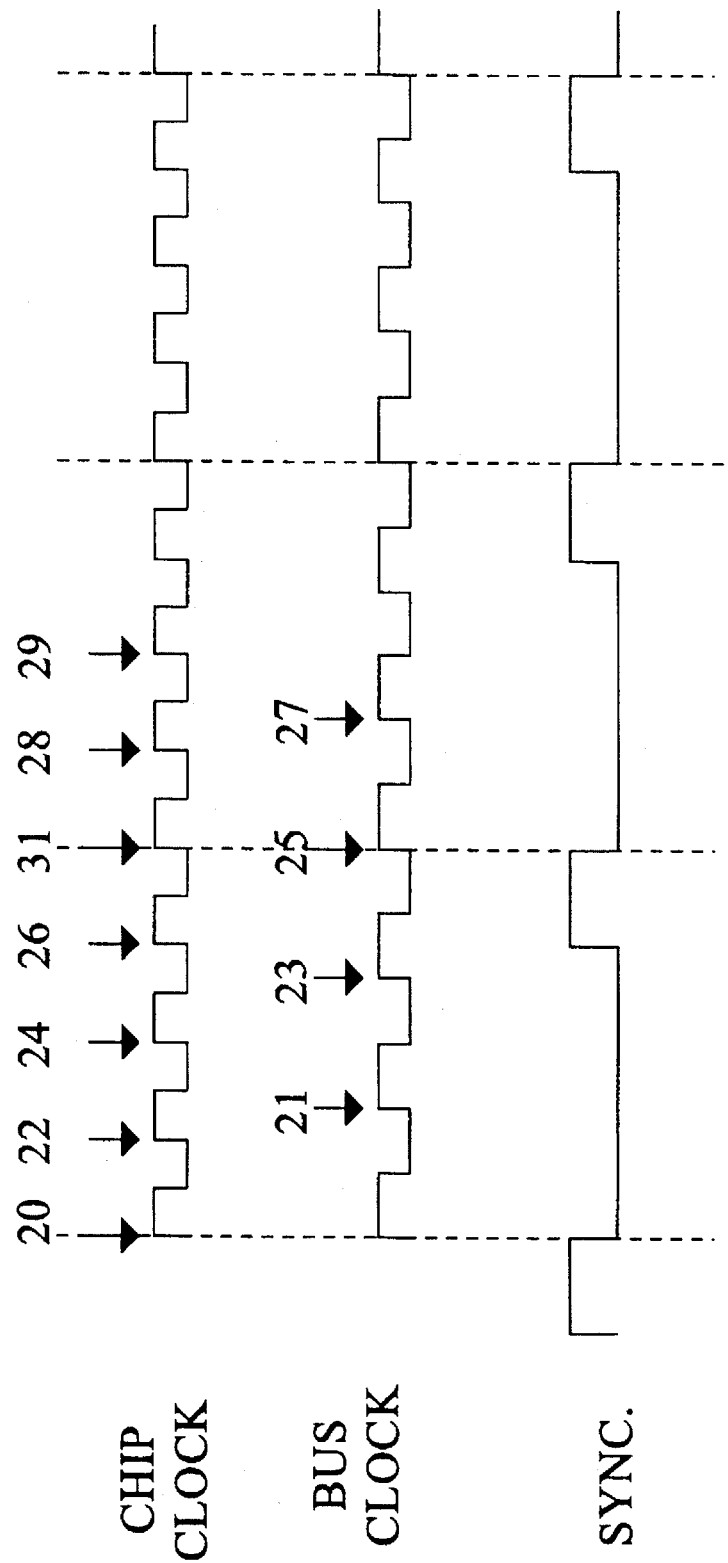
FIG. 2 illustrates the relationship between the chip and bus clocks for the case in which the respective clock frequencies are in the ratio of 4:3.

The present invention is based on the observation that the chip cycles in which data cannot be read or written between the chip and the bus are independent of the value of N if the clocks are in the ratio of N:(N−1). Refer now to FIG. 2 which illustrates the relationship between the chip and bus clocks for the case in which the respective clock frequencies are in the ratio of 4:3. The clock pulses occur in repetitive groups corresponding to 4 chip clock pulse for each 3 bus clock pulses. Once every 4 chip clock pulses, the two clocks will have coincident rising edges as shown by the broken lines. It will be assumed in the following discussion that data is clocked into latches and registers on the rising edges of the respective clock pulses. It will also be assumed that data is passed through a transparent latch when its enable input is high, and that data is held in the latch on the falling edge of its enable signal. If chip 15 sends data at time 20 determined by the chip clock, the data can be received by a latch connected to the bus at time 21. Out-bound data leaving chip processing circuit 13 at time 22 will pass through latch 14 when the chip clock signal is low and will be sent on the bus at time 23, and the data can be received by another chip on the bus at time 25. However, if data were clocked into latch 14 in the later half of the third chip clock pulse, i.e., time 24, the data would be replaced by the data clocked in at time 26 before the data would be sent on the bus at time 25. Hence, data cannot be send on the chip clock pulse at time 24.

Now consider the case in which data is to read into chip 15. Data placed on the bus by another chip at time 25 cannot be read until time 27; however, this is after the start of the chip clock pulse shown at time 28. Hence, this data cannot be read by chip 15 until time 29. Data that was placed on the bus at time 23 can be read at time 31. Hence, no data can be read from the bus at time 28. It should be noted that the time chip time slots in which data cannot be sent or received are two chip clock cycles before the point of synchrony of the two clocks and two chip clock cycles after the point of synchrony of the two clocks, respectively. It can be shown that this is truely independent of the value of N. Hence, if chip 15 can determine when the point of synchrony occurs, it can always identify the two cycles in question without any other information.

In the preferred embodiment of the present invention, chip 15 receives a synchronization signal that is generated by clock generator 12. The synchronization signal informs the synchronization processing circuitry 16 of the chip cycle at which synchronization takes place. For example, the synchronization signal can be sent a predetermined number of chip clock cycles before synchrony occurs. Synchronization processing circuitry 16 preferably generates send and receive inhibit signals that prevent the other circuitry 13 on the chip from attempting to receive or transmit data during the forbidden receive and transmit time slots.

Figure 3:
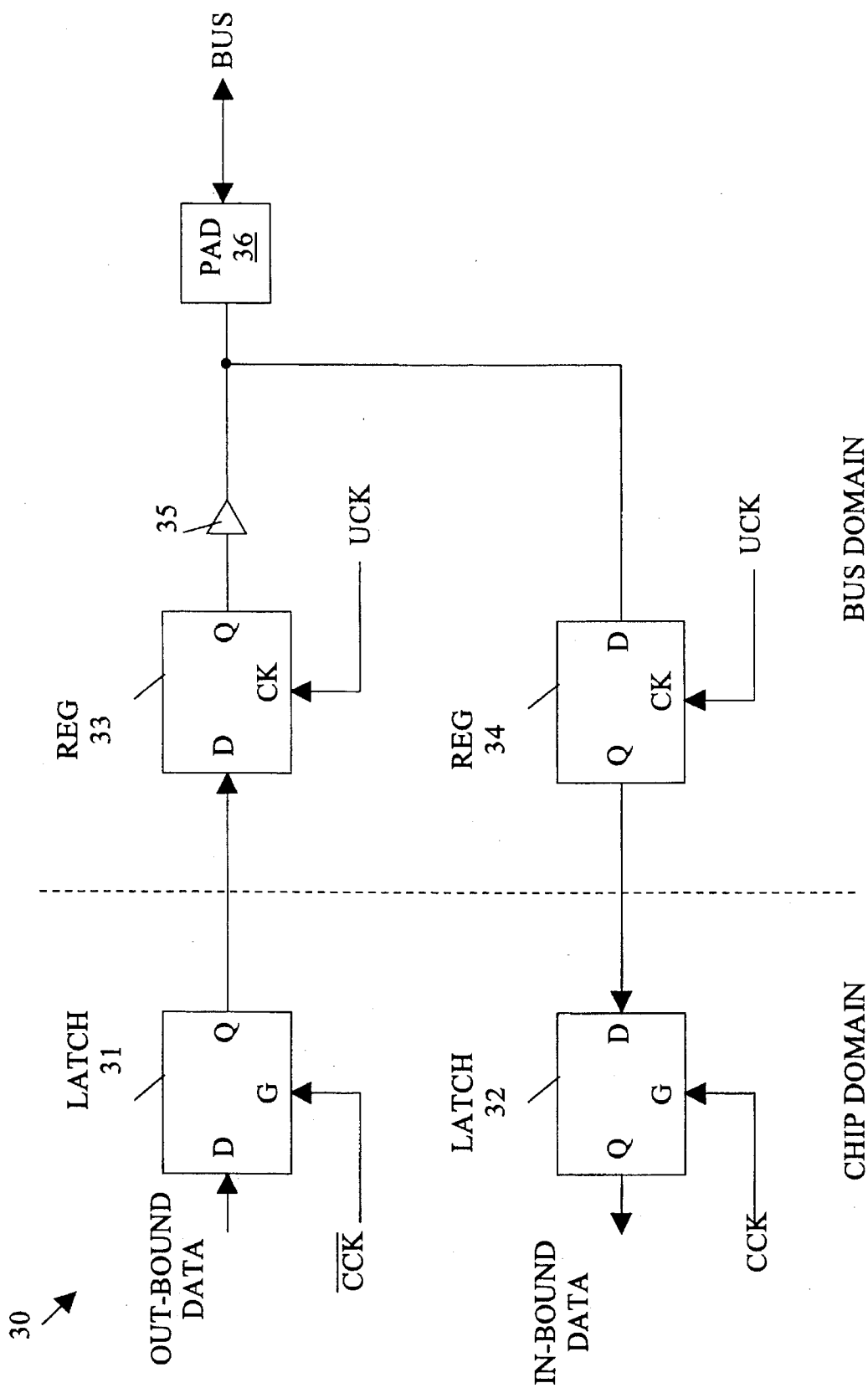
FIG. 3 is a block diagram of a first interface circuit according to the present invention for transmitting and receiving data from the bus shown in FIG. 1.

The manner in which interface 14 operates will now be explained in more detail. The complexity of interface circuit 14 depends on the maximum value of N. The case in which N is less than or equal to 4 will be discussed first, as this is the simplest case. Refer now to FIG. 3 which is a block diagram of an interface circuit 30 according to the present invention. Interface circuit 30 can be divided into two domains, a chip domain which operates in synchrony with the chip clock whose signal is denoted by CCK and a bus domain that is controlled by the bus clock whose signal is denoted by UCK. A pad 36 on the chip is used to make the physical connection to the bus.

Out-bound data is placed in a transparent latch 31. The data is read from latch 31 into an edge triggered D register 33 which is preferably an edge triggered flip-flop that is controlled by the bus clock signal. A buffer 35 is used to drive the bus line off of the output of register 33. Similarly, in-bound data from the bus is read into a D register 34 which is preferably an edge triggered flip-flop that is controlled by the bus clock. The data is transferred to the chip domain via a transparent latch 32 operating off of the chip clock.

When the worse case timing occurs (i.e., beginning at time 22) for N=4. Data will be moved between the latch-register pairs before new data is moved into the input stage of the pair. For example, out-bound data previously loaded into latch 31 and now on the Q output of latch 31 is transferred to the Q output of register 33 on the rising edge of UCK at time 21 before new data at the input to latch 31 arrives on the next falling edge of CCK after time 22.

Unfortunately, when N>4, the simple latch/flip-flop arrangement shown in FIG. 3 is not reliable because of the overlap between UCK and CCK. Consider the worse case in which N=5, there will be a data cycle in which UCK clocks data into registers 33 just as latch 31 opens and changes its output to the new data at its input. This situation presents a race between UCK rising and CCK falling. Hence, it cannot be guaranteed that register 33 will receive the correct data. This situation becomes worse as N increases.

Figure 4:
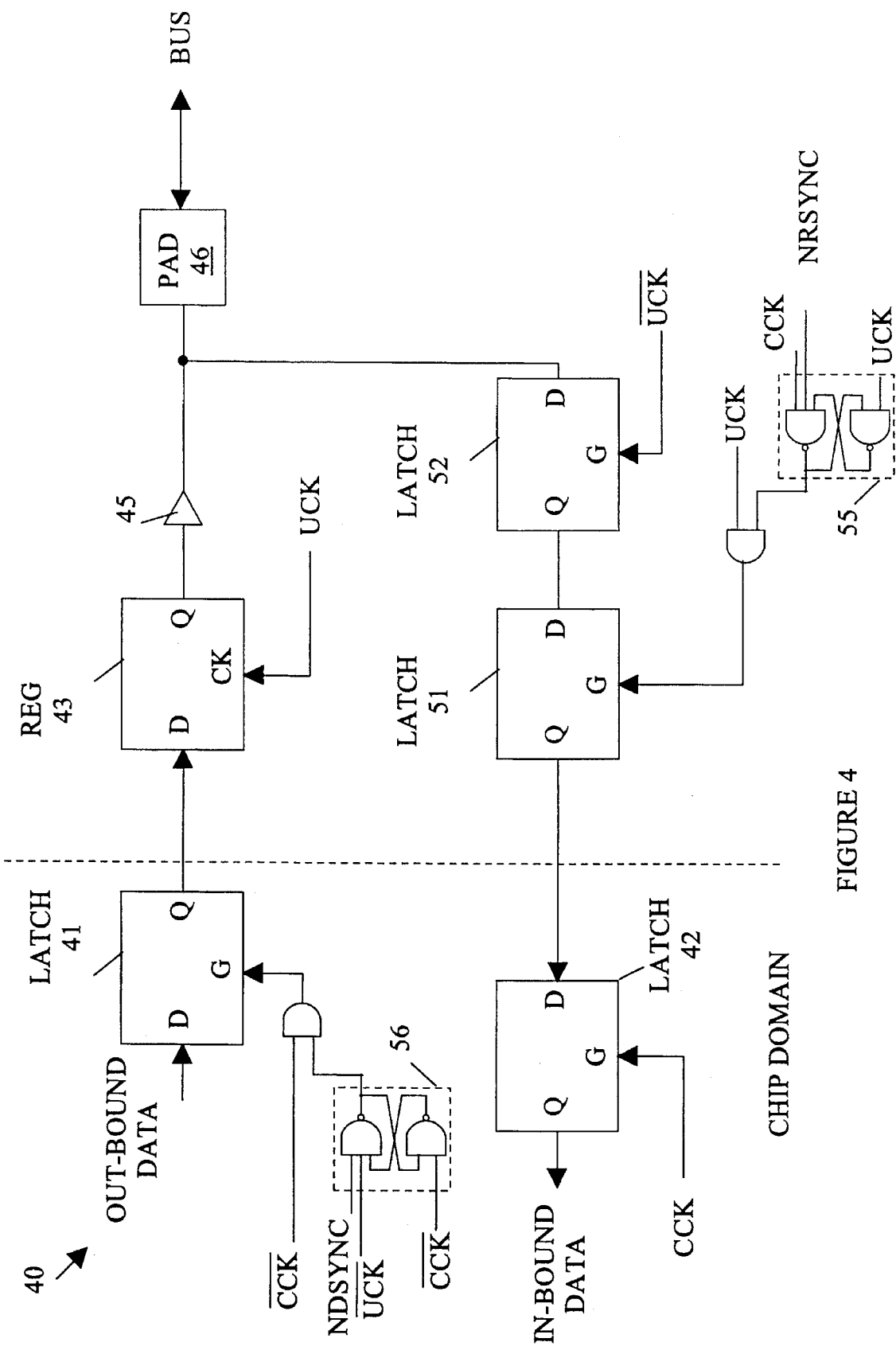
FIG. 4 is a block diagram of a second interface circuit according to the present invention for transmitting and receiving data from the bus shown in FIG. 1.

To avoid this race problem, systems in which N>4 preferably utilize the interface circuit shown in FIG. 4 at 40. Consider the transfer of data between two chips connected to the bus. The chip domain in which the data originates will be referred to as the sender, and the chip domain to which the data is to be transferred will be referred to as the receiver. The basic mechanism by which synchronization is achieved involves gating the clock of the sender with a locally generated synchronization signal such that whenever the receiver's latch is updating, the output of the sender's latch remains steady. The sender's latch only updates when the receiver's latch is not updating. However, when the clocks of the sender and receiver are synchronous, as is the case when the rising edges are coincident, both the sender's latch and the receiver's latch are allowed to update simultaneously. This assures that the receiver's data will always be stable and will be in step with the data the sender intends to transfer.

In interface circuit 40, register 34 shown in FIG. 3 is split into a pair of transparent latches 51 and 52. Control circuitry 55 assumes that latch 51's data is captured by latch 42 before new data from latch 52 is received. Control circuit 55 includes a control flip-flop which is set low at the falling edge of the sender's clock if and only if a signal referred to as NRSYNC is high. The control flip-flop is cleared HIGH unconditionally on the falling edge of the receiver's clock. The control flip-flop is also cleared HIGH when NRSYNC is low. Since, as explained in more detail below, NRSYNC will be low when the clock edges from the two frequency domains are coincident, the control flip-flop will allow simultaneous update of sender and receiver domain latches when a concurrent clock edge occurs. When the edges are not coincident, the control flip-flop guarantees that the receiver domain latch has completed updating (i.e., its clock edge has fallen) before the sender domain latch updates its contents.

To optimize circuit performance, the physical implementation of the transfer latch 42 along the in-bound path resides at the destination inside chip 15. This eliminates duplication of data latches in the receiver clock domain. Similarly, control circuit 56 assures that register 43 has clocked out its data before loading new data from latch 41.

The control circuits utilize signals NDSYNC and NRSYNC which are generated from a single USYNC which informs the chip when coincident rising edges of CCK and UCK will occur. NDSYNC is asserted low from the rising edge of CCK from one cycle before the coincident edge of CCK and UCK to the rising edge of CCK one cycle after the coincident edge of CCK and UCK. NRSYNC is asserted low from the falling edge of CCK from one half cycle before the coincident rising edge of CCK and UCK to the second falling edge of CCK after the coincident edge of CCK and UCK.

As noted above, it is advantageous to also be able to operate a chip according to the present invention in environments in which the bus and chip clocks operate at the same frequencies. This mode of operation will be referred to as the non-ratioed mode in the following discussion. The interface circuit shown in FIG. 4 can provide this operation if the outputs of circuits 55 and 56 are always high. This can be accomplished by forcing NDSYNC and NRSYNC low in this mode of operation. In the preferred embodiment of the present invention, each chip uses the synchronization input to detect non-ratioed operation, i.e., chip and bus clocks being the same. The circuitry on the chip that generates the NDSYNC/NRSYNC signal determines that this input is not periodic and forces these signals to the appropriate value to provide non-ratioed operation. In this case, circuit 56 eliminates the need to wait on the sender's clock edge to transmit data to the receivers clock domain when operating in non-ratioed mode. Hence, circuit performance is maintained at its optimal level in non-ratioed operation.

In non-ratioed operation, the send and receive inhibition signals shown in FIG. 1 must also be disabled. This is accomplished by connecting the synchronization signal input of the present invention to ground. If no synchronization signal is received, then the send and receive inhibit signals will not be generated. As a result, the chip will send and receive data on each clock cycle.

While the preferred embodiment of the present invention utilizes an external synchronization signal to define the points at which the two clocks are in synchrony, it will be apparent to those skilled in the art that other means may be used. For example, each chip could detect the synchronization point by comparing the chip and bus clock signals received by the chip. This approach; however, would require this circuitry to be duplicated in each chip. The cost of the additional circuitry makes this approach less attractive. In addition, some other means of providing operation for clock ratios having a frequency of 1:1 would be needed.

Various modifications to the present invention will become apparent to those skilled in the art from the foregoing description and accompanying drawings. Accordingly, the present invention is to be limited solely by the scope of the following claims.

What is claimed is:

1. A data communication system for communicating data between a bus running at a first clock frequency and a circuit block operating synchronously with said data bus at a second clock frequency, said communication system comprising:

clock generation means for generating a bus clock signal at said first clock frequency and a chip clock signal at said second clock frequency wherein said first and second clock signal frequencies are in the ratio of (N−1):N where N is an integer greater than 1 and wherein said bus and chip clock signals are synchronized once every N cycles of said chip clock signal;

means for generating asynchronization signal indicating said chip clock signal cycle in which said bus and chip clock signals are synchronized;

means, connected to said circuit block, for receiving data from said bus;

means, connected to said circuit block, for transmitting data on said bus;

means, connected to said circuit block and responsive to said synchronization signal, for identifying a chip clock signal cycle in which data cannot be transmitted by said circuit block on said bus, one said chip clock signal cycle being present in each contiguous block of N said chip clock cycles; and means, connected to said circuit block and responsive to said synchronization signal, for identifying a chip clock signal cycle in which no new data can be received from said bus, one said chip clock signal cycle being present in each contiguous block of N said chip clock cycles, wherein said receiving means comprises:

a first register connected to receive data from said bus, said first register being synchronized to said bus clock signal; and a latch synchronized to said chip clock signal.

2. A data communication system for communicating data between a bus running at a first clock frequency and a circuit block operating synchronously with said data bus at a second clock frequency, said communication system comprising:

clock generation means for generating a bus clock signal at said first clock frequency and a chip clock signal at said second clock frequency wherein said first and second clock signal frequencies are in the ratio of (N−1):N where N is an integer greater than 1 and wherein said bus and chip clock signals are synchronized once every N cycles of said chip clock signal;

means for generating a synchronization signal indicating said chip clock signal cycle in which said bus and chip clock signals are synchronized;

means, connected to said circuit block, for receiving data from said bus;

means, connected to said circuit block, for transmitting data on said bus;

means, connected to said circuit block and responsive to said synchronization signal, for identifying a chip clock signal cycle in which data cannot be transmitted by said circuit block on said bus, one said chip clock signal cycle being present in each contiguous block of N said chip clock cycles; and means, connected to said circuit block and responsive to said synchronization signal, for identifying a chip clock signal cycle in which no new data can be received from said bus, one said chip clock signal cycle being present in each contiguous block of N said chip clock cycles, wherein said receiving means comprises a first register connected to receive data from said bus, said first register being synchronized to said bus clock signal and a latch synchronized to said chip clock signal, and wherein said first register comprises:

a first latch reading data from said bus in response to said bus clock signal; and a second latch in series with said first latch, said second latch receiving data from said first latch in response to a transfer signal such that said second latch is prevented from updating while the state of said first latch is changing.

3. A data communication system for communicating data between a bus running at a first clock frequency and a circuit block operating synchronously with said data bus at a second clock frequency, said communication system comprising:

clock generation means for generating a bus clock signal at said first clock frequency and a chip clock signal at said second clock frequency wherein said first and second clock signal frequencies are in the ratio of (N−1):N where N is an integer greater than 1 and wherein said bus and chip clock signals are synchronized once every N cycles of said chip clock signal;

means for generating a synchronization signal indicating said chip clock signal cycle in which said bus and chip clock signals are synchronized;

means, connected to said circuit block, for receiving data from said bus;

means, connected to said circuit block, for transmitting data on said bus;

means, connected to said circuit block and responsive to said synchronization signal, for identifying a chip clock signal cycle in which data cannot be transmitted by said circuit block on said bus, one said chip clock signal cycle being present in each contiguous block of N said chip clock cycles; and means, connected to said circuit block and responsive to said synchronization signal, for identifying a chip clock signal cycle in which no new data can be received from said bus, one said chip clock signal cycle being present in each contiguous block of N said chip clock cycles, wherein said transmitting means comprises:

a latch synchronized to said chip clock signal and connected to receive data from said circuit block; and a first register connected to transmit data on said bus, said first register being synchronized to said bus clock signal and being connected to the output of said latch.

4. The data communication system of claim 3 further comprising means, connected to said latch, for preventing said latch from updating while said register is changing state.

* * * * *